United States Patent
Rothschild

(12) 
(10) Patent No.: US 6,651,053 B1
(45) Date of Patent: Nov. 18, 2003

(54) INTERACTIVE SYSTEM FOR INVESTIGATING PRODUCTS ON A NETWORK

(75) Inventor: Leigh M. Rothschild, Miami, FL (US)

(73) Assignee: Barpoint.com, Inc., Ft. Lauderdale, FL (US)

(*) Notice: Subject to any disclaimer, the term of this patent is extended or adjusted under 35 U.S.C. 154(b) by 412 days.

(21) Appl. No.: 09/649,184

(22) Filed: Aug. 28, 2000

Related U.S. Application Data

(63) Continuation-in-part of application No. PCT/US00/01885, filed on Jan. 25, 2000.
(60) Provisional application No. 60/187,646, filed on Mar. 8, 2000, provisional application No. 60/185,546, filed on Feb. 28, 2000, and provisional application No. 60/118,051, filed on Feb. 1, 1999.

(51) Int. Cl.[7] .............................................. G06F 17/30
(52) U.S. Cl. ........................... 707/3; 707/10; 707/104.1
(58) Field of Search ................................ 707/3, 4, 5, 6, 707/10, 1, 104.1, 103 R, 206, 503, 504, 523; 709/219; 705/23, 26, 27

(56) References Cited

U.S. PATENT DOCUMENTS

| | | | |
|---|---|---|---|
| 5,791,991 A | 8/1998 | Small .......................... 463/41 |
| 5,804,803 A * | 9/1998 | Cragun et al. ............... 235/375 |
| 5,905,248 A | 5/1999 | Russell et al. ......... 235/462.15 |
| 5,905,251 A | 5/1999 | Knowles ................ 235/472.01 |
| 5,913,210 A | 6/1999 | Call .............................. 707/4 |
| 5,918,214 A | 6/1999 | Perkowski ................... 705/27 |
| 5,933,829 A | 8/1999 | Durst et al. ................. 707/10 |
| 5,950,173 A * | 9/1999 | Perkowski ................... 705/26 |
| 5,978,773 A * | 11/1999 | Hudetz et al. ............... 705/23 |
| 5,979,757 A | 11/1999 | Tracy et al. ................ 235/383 |
| 5,992,752 A | 11/1999 | Wilz, Sr. et al. ........ 235/472.01 |
| 6,027,024 A | 2/2000 | Knowles ................ 235/472.01 |
| 6,101,483 A * | 8/2000 | Petrovich et al. ............. 705/26 |
| 6,108,656 A | 8/2000 | Durst et al. .................. 707/10 |
| 6,123,259 A * | 9/2000 | Ogasawara ................. 235/380 |
| 6,134,548 A * | 10/2000 | Gottsman et al. .............. 707/5 |
| 6,317,718 B1 * | 11/2001 | Fano ............................. 705/1 |
| 6,401,085 B1 * | 6/2002 | Gershman et al. ............. 707/4 |

* cited by examiner

*Primary Examiner*—John Breene
*Assistant Examiner*—Miranda Le
(74) *Attorney, Agent, or Firm*—Anthony J. Casella; Gerald E. Hespos

(57) ABSTRACT

An interactive search system for use with a global computer network, e.g., the Internet, using a search identifying barcode to rapidly and effectively obtain a supply of related information for presentation to a user. A computer, either landline based or mobile, may be used to input a UPC code, taken from a package or advertisement or prestored in the computer, to an implementing server on the network. The server contains a database of product and manufacturer identifying UPC codes and uses the input UPC code and the database to identify the manufacturer and is programmed to then perform a search of the network to locate sites relating to or operated by the manufacturer. Also, the server may search the network on a product basis to locate other sites containing the UPC under search. Using "parsing" technology, the server "pulls out" the product description, transmits it to and places it in a random access memory (RAM) or storage of the computer, and proceeds to perform further searching relying on the product description to uncover relevant information. Accordingly, using a single input, a collection of product-related and manufacturer information is quickly assembled in the computer available for a user's consideration all at once at any time.

42 Claims, 2 Drawing Sheets

INTERACTIVE SYSTEM FOR INVESTIGATING PRODUCTS ON A NETWORK

CROSS-REFERENCE TO RELATED APPLICATIONS

This application is a continuation-in-part application of International Application PCT/US00/01885, with an international filing date of Jan. 25, 2000, based on Provisional Patent Application, U.S. Serial No. 60/118,051 filed on Feb. 1, 1999, and issued as U.S. Pat. No. 6,430,554 B1, the disclosure of which is incorporated herein by reference.

This application is also based on U.S. Provisional Patent Application, U.S. Serial No. 60/185,546, which was filed Feb. 28, 2000 and is entitled "METHOD OF VERIFYING BARCODE/UPC NUMBERS OR OTHER SYMBOLOGIES AND LINKING SUCH NUMBERS TO INFORMATION ON A GLOBAL COMPUTER NETWORK" and U.S. Provisional Patent Application, U.S. Serial No. 60/187,646, which was filed Mar. 8, 2000 and is entitled "INTERACTIVE SYSTEM FOR INVESTIGATING PRODUCTS ON A NETWORK THROUGH A MOBILE DEVICE", both disclosures of which are incorporated herein by reference.

BACKGROUND OF THE INVENTION

1. Field of the Invention

The present invention relates to a system for searching an electronic network, such as the Internet, for product information, and, more particularly, to a method and means by which a user can quickly do a product search through databases on a global network with a simple input that enables interactive communication with a server adapted to widely seek and provide the information sought.

2. Description of the Related Art

Global electronic and computer networks, such as the Internet, provide access to a tremendous amount of information relating to various companies and their products. It is difficult, however, for a user to investigate a particular product on a global computer network when the product is sold under more than one name, or when the user is not sure of the proper name of the product. Similarly, the user may not know who is a manufacturer or a local supplier of the product. It therefore can be quite a time-consuming and complex procedure to do an effective product search through all of the web sites and databases available that may contain pertinent information.

As the global computer networks, such as the Internet, are now capable of being accessed by various mobile devices in addition to landline based devices, searches that are complex and time-consuming are a deterrent to their use. These mobile devices include Internet telephones, Internet Portable Digital Assistants (PDA's), and various other such Internet mobile devices. Many of these devices allow instant access to the Internet through wireless modems or other means, and some allow the collection of information and then the transfer of that information to landline based (desktop) computers for access to the Internet. The Palm VII™ wireless PDA is an example of a current Internet capable wireless device; the Palm III-V™ are examples of current PDA's that can transfer information for later Internet access. Such mobile devices allow the users to have tremendous amounts of information available to them on a mobile basis.

In a different area of commerce, a system has been developed in the United States for product identification, primarily for use on an actual article, that is implemented with Uniform Product Codes (UPC's). This UPC system is administered by a Uniform Code Council. A manufacturer who is interested in utilizing the UPC system registers with the Uniform Code Council and receives a unique manufacturer code. At present, approximately 300,000 manufacturers are registered with the Uniform Code Council. Once registered, the manufacturer assigns codes to each of its own products. The UPC of a product is a combination of the manufacturer's code and a product code assigned by the manufacturer. To facilitate product identification, the UPC is encrypted as a barcode and placed on the product, where it is machine readable, such as by a scanner at a supermarket checkout counter, and used to digitally identify the product. Once the product is so identified, the digital barcode information read therefrom may be communicated to many different destinations for accounting and inventory purposes and to various databases for recording and archiving.

The UPC system has been adapted for use with computers and networks, such as the Internet, in various ways. For example, U.S. Pat. No. 5,913,210, to C. G. CALL, discloses a system involving the storing of a plurality of UPC's in respective computers with web addresses (URLs) and storing cross-references of the UPC's and URLs in another computer (URL) which can be accessed by further networked computers using the UPC's to find the respective URLs. Also, U.S. Pat. No. 5,804,803, to B. J. CRAGUN ET AL, discloses the retrieval of a document by a client computer system using a scanned UPC to create a URL location in a first server, from UPC and customer data retrieved from a second server, which URL may be used to obtain the document from the first server. Further, U.S. Pat. No. 5,791,991, to M. E. SMALL, discloses an interactive product promotion system which enables the selection of coupons to be downloaded from the Internet, and then UPC's placed thereon to be scanned to the Internet for rebates.

While the prior art is rife with search systems and techniques for interacting with computer networks, and particularly the Internet, to obtain and exchange information of all sorts, they all tend to be on a one-for-one or step-by-step basis.

It is an object of the present invention to provide an interactive system whereby an individual can quickly and easily obtain a supply of the available information about a selected search object, such as a product and/or its manufacturers, from a global computer network.

It is another object of the present invention to provide an interactive method and means that enable an individual to search a global computer network and easily obtain a supply of information regarding a selected product, based on a barcode related to the product.

It is a further object of the invention to provide an interactive system for searching a computer network whereby information regarding products and manufacturers can be quickly obtained, aggregated, and stored for use, based on a product's UPC.

It is also an object of the present invention to provide an interactive system for quickly and easily obtaining a supply of information about a selected product and/or its manufacturers or providers from a server using a barcode related to the product.

It is another object of the present invention to provide a method and means for determining the type of input relating to the search object entered into the interactive system and verifying its accuracy.

SUMMARY OF THE INVENTION

The above-stated objects are met by an interactive search system that is directed to interact primarily with global computer networks, particularly the Internet, using a product identifying barcode to rapidly and effectively obtain a supply of product-related information for presentation to a user. In accordance with the present invention, a suitable terminal, typically a desktop computer and modem connection, is used to access an implementing server containing a database of product and manufacturer or provider identifying codes, preferably UPC manufacturer codes. Information relating to a particular product and its manufacturer, is obtained with the product's UPC which may be taken from a package or advertisement or pre-stored in the computer. The UPC can be entered into the computer through manual input numerically, or, alternatively, entered digitally through the use of software and a hand-held scanner adapted to read UPC barcode encryptions. The desktop computer and modem transmit the entire UPC to the implementing server, which reads the manufacturer's code from the UPC and, using the UPC database therein, identifies the manufacturer. The server is programmed to then perform a search of the global computer network or databases contained in local server storage devices to locate sites relating to or operated by the manufacturer. Additionally, the server may search the global computer network on a product basis to locate other sites containing the UPC under search. To aid the server, and reduce search time, it is preferred but not required that the user identify,the general category of the product (auto, book, music or movie cassette, food, hardware, software, etc.) when the UPC is entered. Based on the manufacturer information, and/or the selection of product category, the implementing server is preferably programmed to initially search sites where a greater likelihood of uncovering a particular UPC exists in addition to searching the local server storage devices. Using "parsing" technology, the server may then "pull out" the product description, transmit it to and place it in the random-access memory (RAM) or storage of the desktop computer, and proceed to perform further searching relying on the product description to uncover relevant information. The server can accordingly quickly assemble a collection of product-related and manufacturer information in the RAM or storage of the desktop computer. The collection of assembled information is then available for a user's consideration all at once at any time. Preferably, the assembled information will provide the user with the name of a source for purchasing the particular product, and, further, the server will automatically link the computer with the source's site on the global computer network, or a prearranged site on the server, to permit direct ordering. As will readily be seen, the system of the invention permits an individual to avoid the time-consuming hassle of performing multiple "key word" searches on the global computer network to uncover the desired collection of product-specific information on a step-by-step basis.

In an enhancement of the system, a UPC can be input into a mobile device, e.g., a laptop computer or Portable Digital Assistant (PDA), and stored into the memory of the mobile device. To facilitate entering UPC's, PDA's have been developed which include a scanner for reading an encrypted barcode and software for deciphering and storing the encryption. These PDA's can be used advantageously to provide an individual with a handy tool for collecting and generating a list of multiple UPC's, i.e., a "wish list" of goods, while in conventional retail outlets. Once stored, the UPC can be transferred to a landline based computer which can access the implementing server to implement the search as described above. The UPC or list of UPC's ("Wish list") can also be transferred to another user of the system as to share information on items of common interest or as a registry of items for others to purchase for the initial user. This will allow the second user to purchase any item in the list using various e-commerce services. The UPC's can be transferred using any known transfer means, such as direct cable, infrared, bluetooth, etc.

In a further enhancement of the system utilizing a mobile device, the UPC can be input into a wireless portable computer, e.g., an Internet-enabled Portable Digital Assistant (PDA) or a wireless Internet or server accessible phone, and transmitted either directly or indirectly to the implementing server to obtain product information. The portable computer may be provided with software to interact through a wireless transmission path with the server and obtain the information as described above at a retail location. With this capability, a customer can investigate a product while he is present in a retail location and contemplating purchase of the product. For example, a user going to the local mall to go shopping sees various items that he would like to consider buying in the future or learning more about but does not want to purchase this day. The user enters the UPC number for the item (or a barcode number or other symbology if a UPC number is not available) and the user receives an immediate image of the item on his mobile device. If the user wants additional information on the item, he can "click" on the image of the item and additional information including textual information, videos and photos pertaining to the item will be presented to the user. The user continues shopping in the mall and gathers additional items that he is interested in to create a "wish list". The user now goes to his home or office and is able to share the information he has collected on the various items with any other interested party. The user can display these items on their mobile device, including on-demand increasing (scaling) the size of the images of the items and requesting from the mobile device additional information on the items (perhaps price comparisons or reviews). The user can also transfer all information on the mobile device to another mobile device or transfer the information to a landline based computer. In essence, the user has taken real items and effortlessly brought them into his mobile device and then into his home or office.

As another enhancement of the system, an additional database can be created and located in an individual's desktop computer to maintain a library of UPC's therein. For example, the UPC codes of various purchased products can be entered into the library. The library of UPC's is then transmitted to the implementing server to allow for periodic monitoring of the global computer network to uncover relevant bulletins and/or notices. Thus, for instance, an individual who purchases a product can enter the UPC code into the desktop computer, have the UPC code transmitted to the server, and be automatically informed of any notices relating to the product (e.g., recalls or updates) or similar products. In a preferred embodiment, the server generates a hyperlink connection between the desktop computer and, by activation, the relevant site on the global computer network where the notice is posted. Such an additional database may also be stored in a wireless portable computer to enable a user to readily investigate a range of products while present in a retail location.

The implementing server can also be directly linked to certain sites on the global computer network. Accordingly, a product manufacturer can have its site linked to the server based on the UPC's of products it manufactures so that upon entry of one or more of the relevant UPC's, an individual will not only view information retrieved from the server's database, but also have his/her computer connected to the linked site. Alternatively, a manufacturer may be permitted to set up a web page on the implementing server so that when a user enters the UPC of a particular product he/she will directly communicate with the local web page for the designated product.

It is to be understood that the use of UPC's with the subject invention is convenient, in that the UPC system is presently in place and widely used, but it is not actually necessary for its implementation. Alternative product identification systems, e.g., the Intentional System of Book Numbers (ISBN), can also be used to initiate a search. Additionally, means may be provided for converting UPC's to such other product identification systems to expand and facilitate product searching. As a further alternative, the administrator of the implementing server/database can create a numeric/alphanumeric identification system or code which may be in machine readable (barcode) format for connecting to other information stored therein. By creating such a system, not only products; but also services and businesses can be assigned identification numbers. Such identification numbers also can be conveniently used to communicate with designated web pages on the server or the global network.

Due to the numerous identification systems available for use with the interactive search system, a method is provided to determine which type of identification system is used and to verify the accuracy of the number string entered. During this verification process, extensive checks are performed on the number string entered so it can then be used by the implementing server to perform a search without producing errors. First, the number string is checked for blank spaces and any non-numeric characters; if any are found, the number string is reconciled without the spaces or characters into a composite numerical string. After the number string is reconciled, the string is checked to ensure the required number of digits are present. The number string is then verified to be a valid barcode by comparing it against its check sum digit. At this point, the system can determine whether the number string is a UPC, an ISBN number or other compatible identification system. Additionally, the user-entered product category will be compared to the number string. If the number is a valid barcode but not pertaining to one of the pre-defined identification systems, the user will be notified that the number string is a store generated internal barcode. Alternatively, if the category does not match the manufacturer's industry, as determined by the manufacturer code portion of the UPC, the user will be alerted to a possible conflict. Once verified as a valid identification system number, the number string can be used by the implementing server to perform a search.

A further capability for facilitating network searching may be provided that enables a user to "plug in" to a graphical browser, such that by entering the category of product item to be searched followed by the UPC number in the URL entry line of the browser, the product search will be carried out directly without the user first having to go to a web site and then searching for the product information. Alternatively without a browser "plug in", the user could just enter a specific URL web address into any graphical global network browser with the optional category and with a UPC or code number to let the implementing server institute the search.

The system may also be used in sales promotions by enabling a manufacturer to place its UPC, or a server-supplied identifying code, whether in machine readable form or not on a magazine or newspaper ad, and directing that the UPC or code be used to access the implementing server for further information. A business card or letterhead may be similarly bar-coded to facilitate contacting a company or its website or e-mail address through the server. Further, a magazine or periodical publisher may index the pages of a publication with such barcodes or use existing barcodes enabling a user to readily order copies of articles or pages from a website or the server by e-mail or even allow the user to enter a discussion group on the particular article or product.

DETAILED DESCRIPTION OF THE PREFERRED EMBODIMENTS

Figure 1:
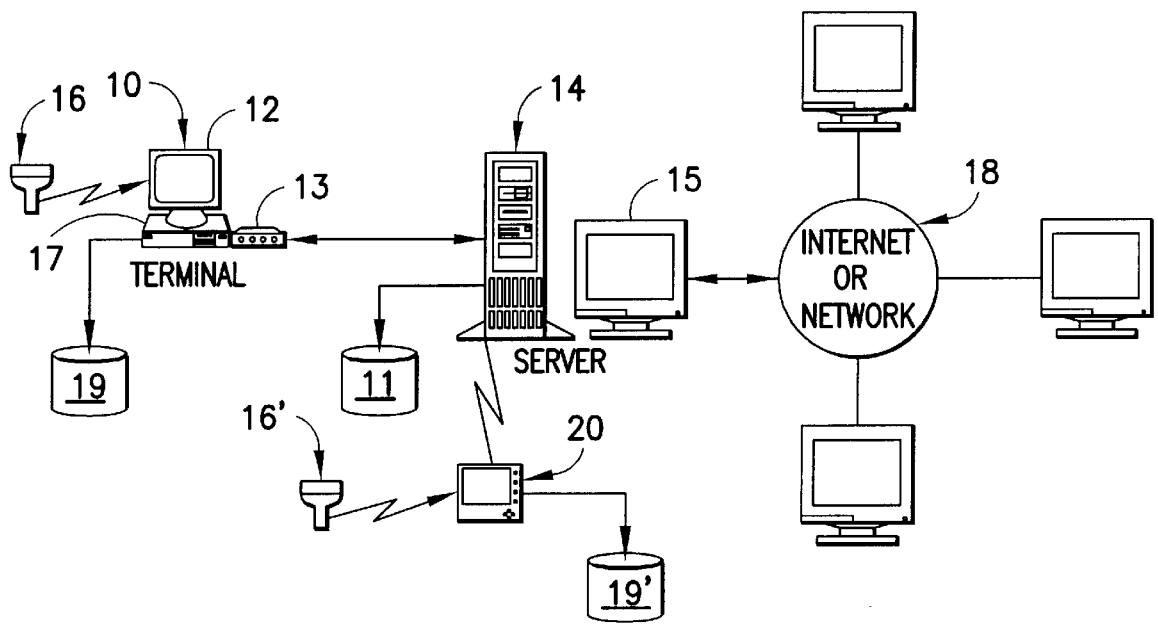
FIG. 1 is a block diagram illustrating a system in accordance with the present invention.

The present invention is directed to providing an electronic or computerized search system that interacts primarily with global computer networks, particularly the Internet, using a search-object-related code, such as a product or manufacturer identifying barcode to rapidly and effectively obtain a supply of product-related information for presentation to a user. In accordance with the invention, as seen in FIG. 1, an individual, using a suitable terminal 10, typically a desktop computer 12 and modem connection 13, can access an implementing server 14 which is provided with a database 11 of product and manufacturer identifying codes, preferably UPC manufacturer codes, and related information. To obtain information relating to a particular product and its manufacturer, the individual obtains the product's UPC such as from a package or advertisement. The UPC can be entered into the computer 12 through manual input numerically, or, alternatively, entered digitally through the use of software and a hand-held scanner 16 adapted to read codes such as UPC barcode encryptions. The user may then transmit the entire UPC from the desktop computer 12 through the modem 13 to the implementing server 14. The server is programmed to read the manufacturer's code from the UPC and, using the UPC database 11, identifies the manufacturer. The server 14 may then be activated to send appropriate information from a local site 15 therein back to the computer 12 for storage or viewing, and to perform a search of the global computer network 18 or local site 15 to locate sites relating to or operated by the manufacturer. Additionally, the server 14 may search the global computer network 18 or local site 15 on a product basis to locate other sites containing the UPC under search. To aid the server, and reduce search time, it is preferred but not required that the user identify the general category of the product (auto, book, music or movie cassette, food, hardware, software, etc.) when the UPC is entered. Based on the manufacturer information, and/or the selection of product category, the implementing server 14 is preferably programmed to initially search sites where a greater likelihood of uncovering a particular UPC exists. For example, there is a greater likelihood of uncovering a UPC identified as corresponding to a food product in a food-related site, than at other sites. Once a matching UPC has been located, the server 14 identifies the product description associated therewith. Using "parsing" technology, the server may then "pull out" the product description, transmit it to and place it in the random access memory (RAM) or storage 17 of the desktop computer 12, and proceed to perform further searching relying on the product description to uncover relevant information. The server 14 can accordingly quickly assemble a collection of product-related and manufacturer information in the RAM or storage 17 of the desktop computer 12. The collection of assembled or aggregated information is then available for the individual's consideration all at once at any time. For example, information regarding product availability and pricing can be obtained, including a pre-determined lowest price for comparison with the prices of the relevant sources. Preferably, the assembled information will also provide the individual with the name of a source for purchasing the particular product, and, further, the server can automatically link the individual with the source's site on the global computer network. As will readily be seen, the system of the invention permits the individual to avoid the time-consuming hassle of performing multiple "key word" searches on the global computer network to uncover the desired collection of product-specific information on a trial-and-error and/or step-by-step basis.

In an enhancement of the system, a UPC can be input into a mobile device 20, e.g., a laptop computer or Portable Digital Assistant (PDA), and stored into the memory of the mobile device 20. To facilitate entering UPC's, PDA's have been developed which include a scanner 16' for reading an encrypted barcode and software for deciphering and storing the encryption. These PDA'scan be used advantageously to provide an individual with a handy tool for collecting and generating a list of multiple UPC's, i.e., a "wish list" of goods, while in conventional retail outlets. Once stored, the UPC can be transferred to a landline based computer 10 which can access the implementing server 14 to implement the search as described above. The UPC or list of UPC's ("wish list") can also be transferred to another user of the system as to share information-on items of common interest or as a registry of items for others to purchase for the initial user. This will allow the second user to purchase any item in the list using various e-commerce services. The UPC's can be transferred using any known transfer means such as direct cable, infrared, bluetooth, etc.

In a further enhancement of the system utilizing a mobile device, the UPC can be input into a wireless portable computer 20, e.g., an Internet-enabled Portable Digital Assistant (PDA) or wireless Internet or server accessible phone, and transmitted either directly or indirectly to the implementing server 14 to obtain product information. The portable computer 20 may be provided with software to interact through a wireless transmission path with the server 14 and obtain the information as described above at a retail location. With this capability, an individual can investigate a product while present in a retail location and contemplating purchase of the product. For example, a user going to the local mall to go shopping sees various items that he would like to consider buying in the future or learning more about but does not want to purchase this day. The user enters the UPC number for the item (or a barcode number or other symbology if a UPC number is not available). The device receives the UPC code or other symbology to make sure that it is valid. The device then uses its wireless capabilities to send the code string to a server which is connected to the global computer network, i.e., the Internet. The server checks the string and using database lookup procedures resolves which item in the database relates to the search string. The server then sends back to the mobile device an image on this item. If the user wants additional information on the item, he can "click" on the image of the item and additional information including textual information, videos and photos pertaining to the item will be presented to the user. This information is stored within memory (random access memory or permanent data storage) on the mobile device. When the user wishes to access the information on the mobile device, this memory is accessed and images, video, and/or text are displayed. The user continues shopping in the mall and gathers additional items that he is interested in to create a "wish list". The user now goes to his home or office and is able to share the information he has collected on the various items with any other interested party. The user can display these items on their mobile device, including on-demand increasing (scaling) the size of the images of the items and requesting from the mobile device additional information on the items (perhaps price comparisons or reviews). The user can also transfer all information on the mobile device to another mobile device or transfer the information to a landline based computer. In essence, the user has taken real items and effortlessly brought them into his mobile device and then into his home or office.

As another enhancement of the system, an additional database 19 can be created and located in the individual's desktop or portable computer to maintain a library of UPC's therein. For example, the UPC codes of various purchased products can be entered into the library. The library of UPC's is then transmitted to the implementing server 14 to allow for periodic monitoring of the global computer network 18 to uncover relevant bulletins and/or notices. Thus, for instance, an individual who purchases a baby stroller can enter the UPC code into the desktop computer 12, have the UPC code transmitted to the server 14, and be automatically informed of any notices relating to the baby stroller (e.g., recalls) or similar products. In a preferred embodiment, the server 14 generates a hyperlink connection between the desktop computer 12 and, by activation, the relevant site on the global computer network 18 where the notice is posted. When such an additional database 19' is stored in a wireless portable computer 20, it enables a user to readily investigate a range of products while present in a retail location.

The implementing server 14 can also be directly linked to certain sites on the global computer network 18. Accordingly, a product manufacturer can have its site linked to the server 14 based on the UPC's of products it manufactures so that upon entry of one or more of the relevant UPC's, an individual will not only view information retrieved from the server's database 11, but also be connected to the linked site on the global network 18. Further, a manufacturer may be permitted to set up a web page on the local site 15 in the implementing server 14 so that when a user enters the UPC of a particular product he will directly communicate with the local web page for the designated product.

While the use of UPC's with the present invention is convenient, in that the UPC system is currently in place and widely used, it is not actually necessary in implementing the invention. Alternative product identification systems, e.g., the International System of Book Numbers (ISBN), can also be used to initiate a search. Additionally, means may be provided for converting UPC's to such other product identification systems to expand and facilitate product searching. As a further alternative, the administrator of the implementing server/database can create a numeric/alphanumeric identification system for connecting to other information stored therein. By creating such a system, not only products, but also services and businesses can be assigned identification numbers. For example, a restaurant franchise can be assigned an identification number which is placed (in numeric or alphanumeric form or as barcode encryption) on advertisements. An individual can then obtain information regarding the franchise's services (e.g., prices, locations) by entering the identification number into the implementing server and be linked to a site designated by the franchise. Such identification numbers also can be conveniently used to communicate with designated web pages on the server.

Figure 3:
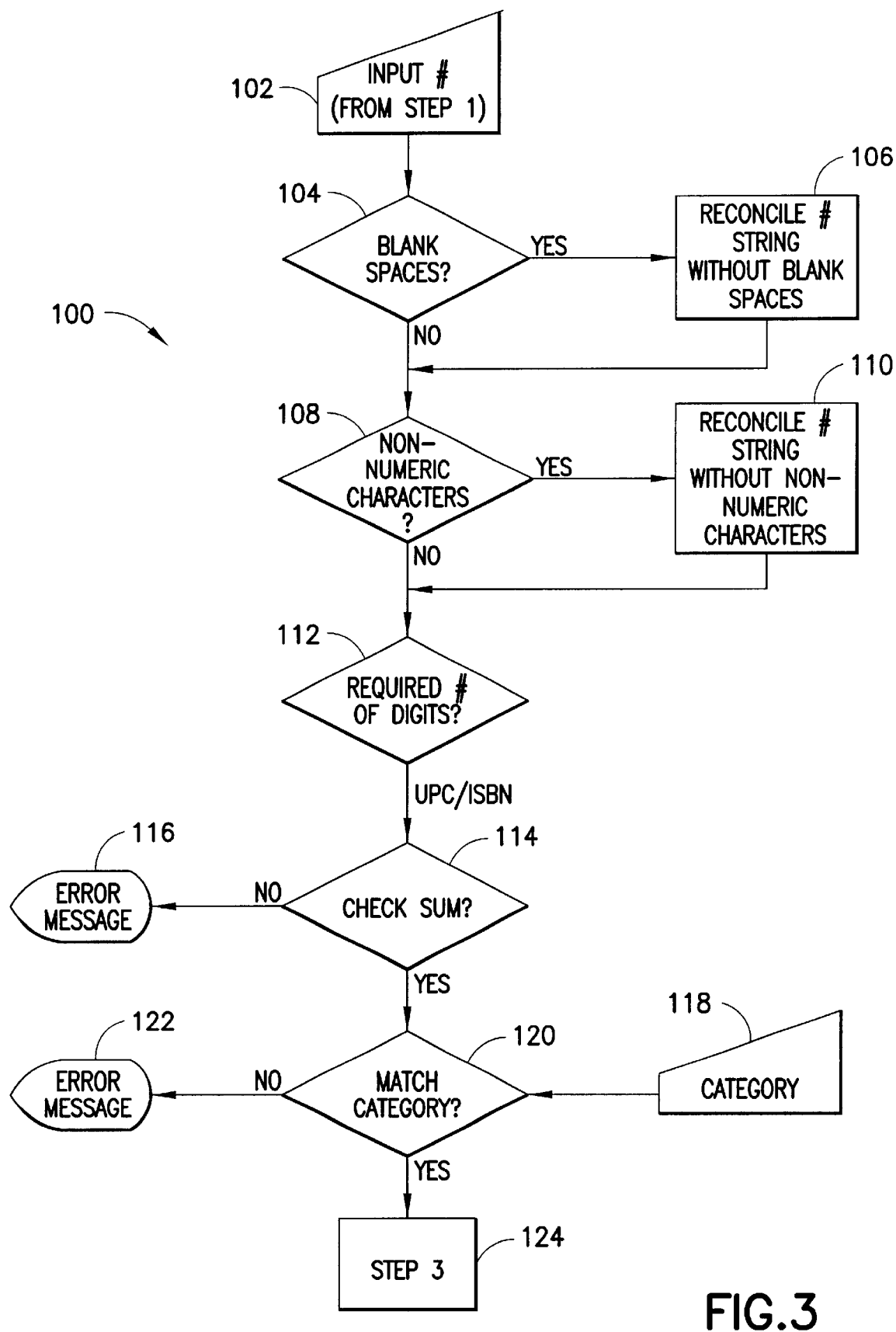
FIG. 3 is a flowchart illustrating a verification process of a number string in accordance with the present invention.

Due to the numerous identification systems available for use with the interactive search system, a method is provided to determine which type of identification system is used and to verify the accuracy of the number string entered. During this verification process 100, as shown in FIG. 3, extensive checks are performed on the number string 102 so it can then be used by the implementing server to perform a search without producing errors. First, the number string is checked for blank spaces 104 and any non-numeric characters 108; if any are found, the number string is reconciled 106, 110 without the spaces or characters into a composite numerical string. After the number string is reconciled, the string is checked to ensure the required number of digits are present 112. The number string is then verified to be a valid barcode by comparing it against its check sum digit 114. If the number string is not a valid barcode, the user will be alerted 116 to enter another number string. At this point, the system can determine whether the number string is a UPC, an ISBN number or other compatible identification system. Additionally, the user-entered product category 118 will be compared to the number string 120. If the number is a valid barcode but not pertaining to one of the pre-defined identification systems, the user will be notified that the number string is a store generated internal barcode 122. Alternatively, if the category 118 does not match the manufacturer's industry, as determined by the manufacturer code portion of the UPC, the user will be alerted to a possible conflict 122. Once verified as a valid identification system number, the number string can be used by the implementing server to perform a search.

The above described verification process 100 can be run at the implementing server 14 or at a suitable terminal with sufficient memory, e.g., a desktop computer 12 or a mobile device 20. The verification process 100 will expedite a search, in that, the interactive system will not conduct extensive, time-consuming searches for an invalid barcode that does not exist. A user will be quickly prompted to enter another number string instead of conducting a lengthy search with no results. The verification process 100 will be most beneficial when employed in a mobile device. By verifying the number string at the retail location, a user can avoid the frustration of returning to their landline based computer, only to find out they have an invalid number string and can not conduct a search. Additionally, when used in a wireless-transmission mobile device, a user can conserve battery life and reduce carrier access time by not conducting time-consuming searches with invalid number strings.

A further capability for facilitating network searching may be provided that enables a user to "plug in" to a graphical browser. The user enters the category of product item to be searched followed by the UPC number in the URL entry line of the browser, and the browser is then used by the implementing server to carry out the product search directly without the user first being connected to a web site for viewing and then searching for the product information. Alternatively without a browser "plug in", the user could just enter a specific URL web address into any graphical global network browser with the optional category and with a UPC or code number to let the implementing server institute the search.

The system is especially adaptable to be used in sales promotions by enabling a manufacturer to place its UPC, or a server-supplied identifying code, on a magazine or newspaper ad or other document, and directing that the UPC or code be used to access the implementing server for further information. A business card or letterhead may be similarly bar-coded to facilitate contacting a company or its website or e-mail address through the server. Further, a magazine or periodical publisher may index the pages of a publication with such barcodes or use existing barcodes enabling a user to readily order copies of articles or pages from a website or the server by e-mail or even allow the user to enter a discussion group on the particular article or product.

Figure 2:
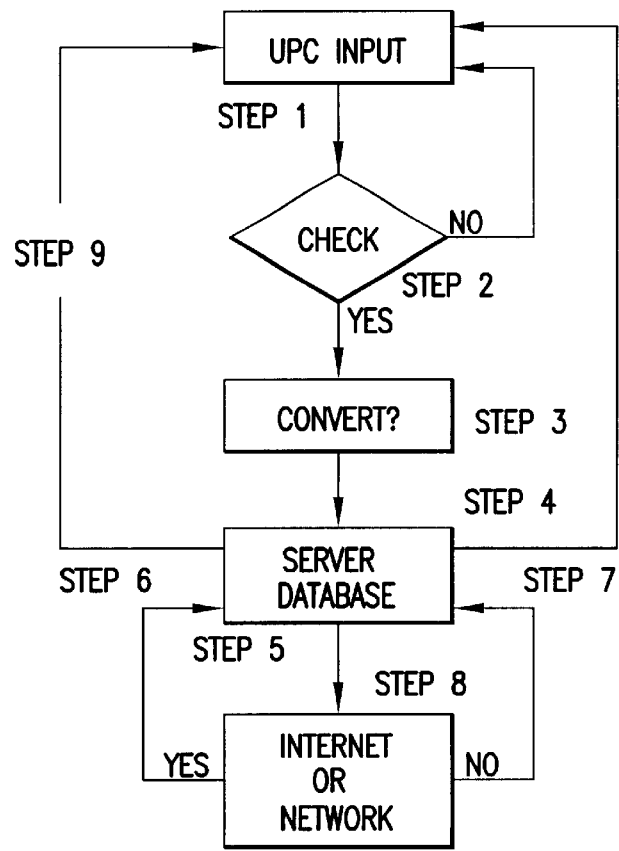
FIG. 2 is a flowchart illustrating an exemplary procedure for searching a global network in accordance with the present invention.

A preferred exemplary procedure for utilizing the present invention beginning with a user entering a UPC number until the search results provide stored information for displaying manufacturer, product, web page, and other information, will now be described with reference to FIG. 2.

Step 1: A user, by means of an electronic terminal, e.g., a computer, inputs selected barcode information on the object of the search, e.g., a UPC number, and a selected optional product category to the web site (URL) of an implementing server containing databases relating the input coded information and product category to other web sites on a global network.

Step 2: The server is programmed to run extensive checks to verify that the UPC number entered is valid. This verification process is shown in FIG. 3 as described above in detail. These checks may include making sure that the length of the number is valid for the category selected, that books begin with "978", that the checksum digit is correct, that no alpha characters are entered where not allowed, and several other steps depending on the category selected. If the UPC is not valid, a signal is returned to the input terminal to indicate the UPC is incorrect. A valid UPC is coupled to the next step.

Step 3: If a book or audio book category is selected, the UPC number is converted to an ISBN number, and other appropriate conversions may be carried out. After any necessary conversions, the number is used to address the server databases.

Step 4: The server's UPC manufacturer's databases are queried (using the first 6 digits of the UPC number) to find the most current information on the publisher and/or manufacturer identified by the UPC code. The server's data sources indicate the category or categories of the products for which the identified publisher and/or manufacturer is registered, and that information is used to verify that the user input the correct optional product category. If the user inputted an incorrect or unknown category, what data sources to use to find the product will be indicated.

Step 5: Many sources are then queried (both local databases and Internet databases) using the UPC or ISBN number to find the most current information available on the product of the selected category.

Step 6: If the product information is found, the information is sent from the server and stored in memory at the user terminal for use together in a body at any time. Also, a "Search Results" Web page may be displayed with all the appropriate information, including links (either by UPC number or product description) to many other sources for additional information.

Step 7: If the product information is not found, a signal is sent from the server and a web page is displayed indicating such, and allowing the user to input (Step 1) an alpha description of the product that is being sought. If the manufacturer's information is then found (Step 6), it may be stored and displayed based on the UPC number entered.

Step 8: To further the product information search, the system then reverts to "Step 6", using the user-input alpha description as a link to the other sources for additional information.

Step 9: When all of the selected product and manufacturer information has been searched and found, it will be collected and stored in a database in memory at the user terminal enabling the user to readily review all of the found information at one time at any time.

Consequently, by simply once inputting, from an electronic terminal to an implementing server, selected coded and category information relating to products and their manufacturers, publishers, and commercial or other providers or suppliers, a user can automatically search and collect a body of pertinent information available from many sites on a computer network and store all of the collected information for consideration at one time.

It will be understood by those of skill in the art that a variety of combinations of hardware and software may be used to implement all of the features of the invention and that the ability to select, assemble, and connect the hardware and adapt and write the software for such combinations, will be readily within the purview of the skilled artisan using the foregoing descriptions and suggestions without the need for undue experimentation. Applicant has assembled and is operating such a system but it will be appreciated that its description here would serve no practical purpose by way of enablement as it would be too specialized and extensive to include in this application and is constantly being changed and updated during testing. Also, technological progress in the field would probably render such a particular current embodiment obsolete by the time this application issues.

What is claimed is:

1. An interactive search system for obtaining a supply of information relating to the object of the search from a global computer network for presentation to a user, said system comprising:

an implementing server coupled to the global computer network and comprising database means for storing search-object-related information and associated information on where further search-object-related information can be located on the global computer network;

a mobile data-collecting means for collecting a coded input and comprising a first transferring means for sending said coded input;

a computer terminal including a second transferring means for receiving said coded input from said mobile data-collecting means, said computer terminal being coupled to said implementing server and operable by a user to send said coded input for accessing said implementing server, said coded input addressing said stored search-object-related information;

means, responsive to said coded input, for activating said implementing server to use said associated information to access said further search-object-related information on the global computer network; and means for collecting and storing at said computer terminal said further search-object-related information accessed by said implementing server to provide a supply of search-object-related information from the global computer network ready for presentation to the user in accordance with the coded input.

2. A system as in claim 1, wherein said coded input comprises a barcode.

3. A system as in claim 1, wherein said coded input comprises a UPC code.

4. A system as in claim 1, wherein said search-object-related information comprises product-related information and said coded input comprises a manufacturer's code and a related product category.

5. A system as in claim 1, wherein said coded input comprises a code printed on a document.

6. A system as in claim 1, wherein said implementing server has an administrator and said coded input comprises a code provided by said administrator.

7. A system as in claim 1, further comprising means for scanning said coded input into said mobile data-collecting means.

8. A system as in claim 1, wherein said mobile data-collecting means comprises a wireless laptop computer.

9. A system as in claim 1, wherein said mobile data-collecting means comprises a wireless internet phone.

10. A system as in claim 1, wherein said mobile data-collecting means comprises a portable digital assistant.

11. A system as in claim 1, wherein said first and second transferring means are a direct cable connection.

12. A system as in claim 1, wherein said first and second transferring means are an infrared port.

13. A system as in claim 1, wherein said first and second transferring means are a bluetooth chip.

14. A system as in claim 1, wherein said coded input is transferred to a second mobile data-collecting means or a second computer terminal.

15. A system as in claim 1, wherein said mobile data-collecting means comprises means for storing a library of coded inputs for selective transmission to said implementing server.

16. A system as in claim 15, wherein said library of coded inputs is transferred to a second mobile data-collecting means or a second computer terminal.

17. An interactive search system for obtaining a supply of information relating to the object of the search from a global computer network for presentation to a user, said system comprising:

an implementing server coupled to the global computer network and comprising database means for storing search-object-related information and associated information on where further search-object-related information can be located on the global computer network;

a mobile input terminal for collecting a coded input, coupled to said implementing server and operable by a user to send said coded input for accessing said implementing server, said coded input addressing said stored search-object-related information;

means, responsive to said coded input, for activating said implementing server to use said associated information to access said further search-object-related information on the global computer network; and means for collecting and storing at said mobile input terminal said further search-object-related information accessed by said implementing server to provide a supply of search-object-related information from the global computer network ready for presentation to the user in accordance with the coded input.

18. A system as in claim 17, wherein said mobile input terminal is coupled to said implementing server by a wireless communication link.

19. A system as in claim 18, wherein said wireless communication link is a cellular transmission.

20. A system as in claim 18, wherein said wireless communication link is bluetooth transmission.

21. A system as in claim 17, wherein said coded input comprises a barcode.

22. A system as in claim 17, wherein said coded input comprises a UPC code.

23. A system as in claim 17, wherein said search-object-related information comprises product-related information and said coded input comprises a manufacturer's code and a related product category.

24. A system as in claim 17, wherein said coded input comprises a code printed on a document.

25. A system as in claim 17, wherein said implementing server has an administrator and said coded input comprises a code provided by said administrator.

26. A system as in claim 17, further comprising means for scanning said coded input into said mobile input terminal.

27. A system as in claim 17, wherein said mobile input terminal comprises a wireless laptop computer.

28. A system as in claim 17, wherein said mobile input terminal comprises a wireless internet phone.

29. A system as in claim 17, wherein said mobile input terminal comprises a server accessible phone.

30. A system as in claim 17, wherein said mobile input terminal comprises a portable digital assistant.

31. A system as in claim 17, further comprising means for directly linking said implementing server to certain sites on the global computer network.

32. A system as in claim 17, further comprising means for directly linking said mobile input terminal to certain sites on the global computer network.

33. A system as in claim 17, wherein said coded input is transferred to a second mobile input terminal or a computer terminal.

34. A system as in claim 17, wherein said mobile input terminal comprises means for storing a library of coded inputs for selective transmission to said implementing server.

35. A system as in claim 34, wherein said library of coded inputs is transferred to a second mobile input terminal or a computer terminal.

36. An interactive search method for obtaining a supply of information relating to the object of the search from a global computer network for presentation to a user, comprising the steps of:

inputting, by means of an electronic terminal, a coded input relating to the object of the search, to an implementing server containing databases relating the coded input to web sites on a global network;

checking to verify that said coded input is valid by eliminating any blank spaces and non-numeric characters, verifying a required number of digits is present, verifying the required number of digits against a check sum digit and making any predetermined conversions that are required for the search;

first querying, in response to said coded input, said databases of said implementing server to find web sites on the global network related to said coded input;

second querying, in response to said first querying, the websites found related to said coded input for information regarding the object of the search;

transferring all of the information regarding the object of the search that results from said second querying of the websites, to said electronic terminal for providing a supply of information regarding the object of the search obtained from the global computer network ready for presentation to the user in accordance with the coded input.

37. The method of claim 36, further comprising the step of inputting a descriptive category relating to the object of the search when inputting said coded input.

38. The method of claim 37, further comprising the step of comparing said coded input to said descriptive category.

39. The method of claim 36, further comprising the step of directly linking said implementing server to certain sites on the global computer network.

40. The method of claim 36, further comprising the step of directly linking said electronic terminal to certain sites on the global computer network.

41. The method of claim 36, wherein said coded input comprises a barcode.

42. The method of claim 36, wherein said coded input comprises a UPC code.

* * * * *